United States Patent [19]

Cruickshank

[11] Patent Number: 5,429,004
[45] Date of Patent: Jul. 4, 1995

[54] INERTIA FLYWHEEL ASSEMBLY FOR A DYNAMOMETER

[76] Inventor: Ronald W. Cruickshank, 460 Quail Ridge Dr., Westmont, Ill. 60559

[21] Appl. No.: 233,523

[22] Filed: Apr. 26, 1994

[51] Int. Cl.[6] .............................................. G01L 5/13
[52] U.S. Cl. .................... 73/862.29; 73/862.28; 73/862.12; 73/117
[58] Field of Search ............... 73/117, 862.12, 862.13, 73/862.29, 862.28

[56] References Cited

U.S. PATENT DOCUMENTS

| | | | |
|---|---|---|---|
| 2,287,084 | 6/1942 | Bennett | 263/24 |
| 2,563,153 | 8/1951 | Britt | 73/134 |
| 2,749,747 | 6/1956 | Cline | 73/117 |
| 2,982,128 | 5/1961 | Gibson et al. | |
| 2,993,369 | 7/1961 | Bonomo et al. | 73/116 |
| 3,505,863 | 4/1970 | Lucia | 73/116 |
| 3,581,561 | 6/1971 | Tomashek et al. | 73/117.2 |
| 3,592,053 | 7/1971 | Lucia | 73/116 |
| 3,712,127 | 1/1973 | Petersen | 73/118 |
| 3,733,894 | 5/1973 | Dahl | 73/117 |
| 3,837,219 | 9/1974 | Clayton | 73/117 |
| 3,940,978 | 3/1976 | Akkerman et al. | 73/117 |
| 3,969,931 | 7/1976 | Lanning | 73/117.1 |
| 4,169,371 | 10/1979 | Witschi et al. | 73/116 |
| 4,196,617 | 4/1980 | Leone, Sr. | 73/862.12 |
| 4,412,455 | 11/1983 | Borgersen | 73/862.12 |
| 4,450,728 | 5/1984 | D'Angelo et al. | 73/862.28 |
| 4,466,294 | 8/1984 | Bennington et al. | 73/862.13 |
| 4,688,419 | 8/1987 | D'Angelo et al. | 73/117 |
| 5,010,763 | 4/1991 | Schneider | 73/117 |
| 5,086,647 | 2/1992 | Kamata et al. | 73/117 |

*Primary Examiner*—Richard E. Chilcot, Jr.
*Assistant Examiner*—Max H. Noori

[57] ABSTRACT

An inertia flywheel assembly for a dynamometer is portable and provides for accurate testing of the performance of automotive vehicles. In a motorcycle application a flywheel (15) is mounted between swing arms (14) and supported on axle (18) by eccentric adjusting spacers (22), support section (20), and flywheel bearings (21). The flywheel (15) is driven by the motorcycle drive chain (13) and drive sprocket (12). Flywheel speed and acceleration data is provided to the dynamometer by flywheel sensor (27). The motorcycle can be started using starter motor (24). The flywheel assembly is supported by support structure (16) and is portable using transport wheels (17).

20 Claims, 3 Drawing Sheets

INERTIA FLYWHEEL ASSEMBLY FOR A DYNAMOMETER

FIELD OF THE INVENTION

The present invention relates to inertia flywheel assemblies of dynamometers used for performance testing of automotive vehicles.

BACKGROUND OF THE INVENTION

Description of Prior Art

Conventional automotive vehicle dynamometer designs include test bench and chassis dynamometers.

Test bench dynamometers are very accurate because the vehicle power plant is connected directly to the dynamometer. This design has the disadvantage of the time and effort required to remove, test, and replace the power plant.

Chassis dynamometers are more convenient to use than bench test dynamometers but are not as accurate because of the indirect connection between the vehicle power plant and the dynamometer, such as when the tires of a wheeled vehicle drive dynamometer rollers. Chassis dynamometers require a large support structure, are expensive to manufacture and difficult to transport.

It is well known that the performance of an automotive vehicle power plant can be calculated by measuring the rate at which the power plant accelerates a flywheel of known moment of inertia. The present invention uses a unique flywheel assembly to overcome the disadvantages of conventional dynamometer designs.

OBJECTS AND ADVANTAGES

Accordingly, several objects and advantages of the invention are:
(a) To provide a flywheel assembly for a dynamometer which is easy to transport.
(b) To provide a flywheel assembly for a dynamometer which is economic to manufacture by minimizing the mechanical components.
(c) To provide a flywheel assembly for a dynamometer which produces very accurate performance data.
(d) To provide a flywheel assembly for a dynamometer which is light weight and easy to operate.
(e) To provide a flywheel assembly for a dynamometer which is versatile and can be used in many applications.

Further objects and advantages of my invention will become apparent from consideration of the drawings and ensuing description.

SUMMARY OF THE INVENTION

The present invention achieves the afore stated objectives and advantages by directly replacing a final driving component of an automotive vehicle's power transmission, such as a wheel, with an inertia flywheel. The flywheel is mounted in the same position as was the replaced driving component, it is supported by the vehicle, and it is driven by the vehicle's power transmission. This design significantly reduces the complexity of the flywheel assembly. Data relating to the flywheel speed and acceleration can be used by a dynamometer for performance testing of the vehicle.

DETAILED DESCRIPTION OF THE PRESENTLY PREFERRED EMBODIMENTS

An automotive vehicle is considered to be any self powered vehicle and includes, but is not limited to, motorcycles, motorcars, trucks, karts, snow mobiles, all-terrain vehicles, watercraft, aircraft, and scale models. A vehicle power plant can include, but is not restricted to, an internal combustion engine, an electric motor, a turbine, or a flywheel.

Figure 1:
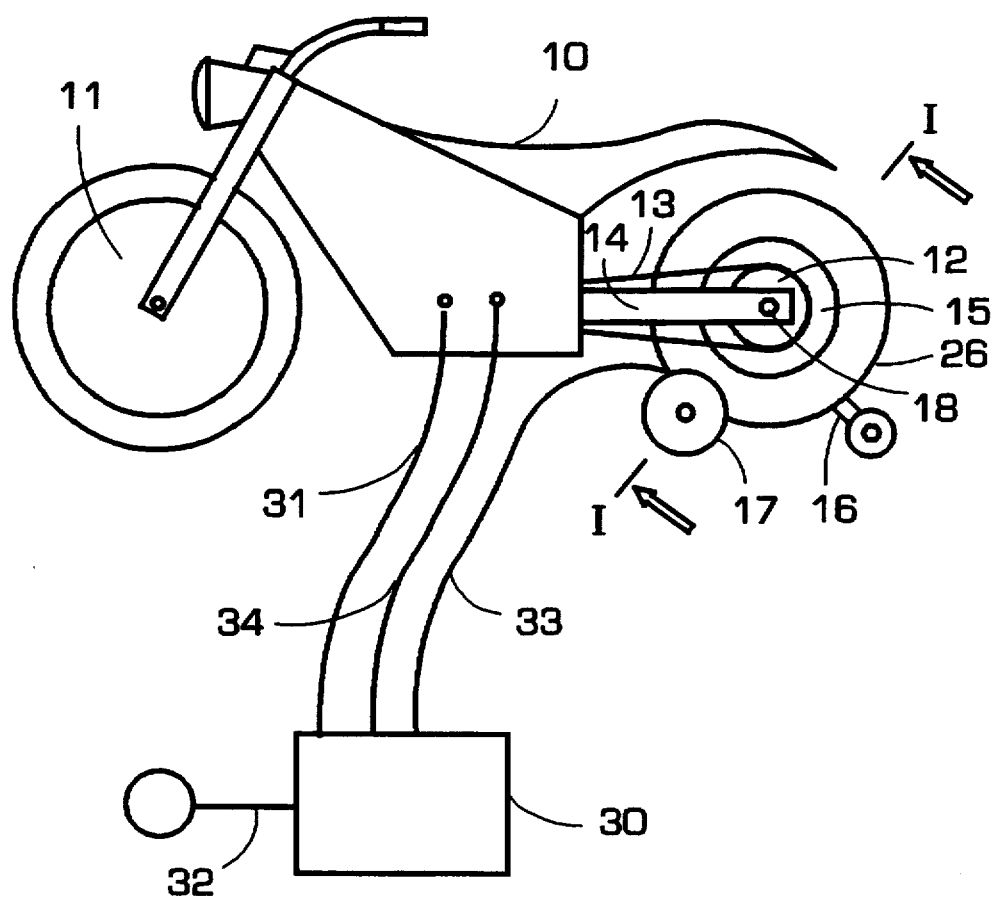
FIG. 1 shows an application of the present invention to a motorcycle dynamometer.

FIG. 1 illustrates an application of the present invention to a motorcycle dynamometer. The motorcycle 10 includes a front wheel 11, a drive sprocket 12, drive chain 13, swing arms 14, and axle 18. The driving wheel of motorcycle 10 is replaced for the duration of testing by a flywheel 15 which is supported by support structure 16 and transport wheels 17. The use of a support structure and transport wheels makes the flywheel assembly highly portable and it is envisaged that many different types of transport structures can be used. In some applications, after the flywheel is mounted on the vehicle the support structure can be removed from the flywheel assembly for the duration of testing. Safety shield 26 at least partially covers flywheel 15 and protects the dynamometer operator, other persons, and the motorcycle from the spinning flywheel during testing. In some applications the use of a safety shield may be optional. Dynamometer system 30 receives vehicle data 31, environment data 32, and flywheel data 33 from flywheel sensor 27. In some applications flywheel sensor 27 is not required because the speed and acceleration of flywheel 15 can be calculated from other data such as the power plant speed, transmission speed, or the transmission ratios between the power plant and the flywheel. In some applications the transmission ratios can be input by a dynamometer operator for use by the dynamometer system.

Figure 2:
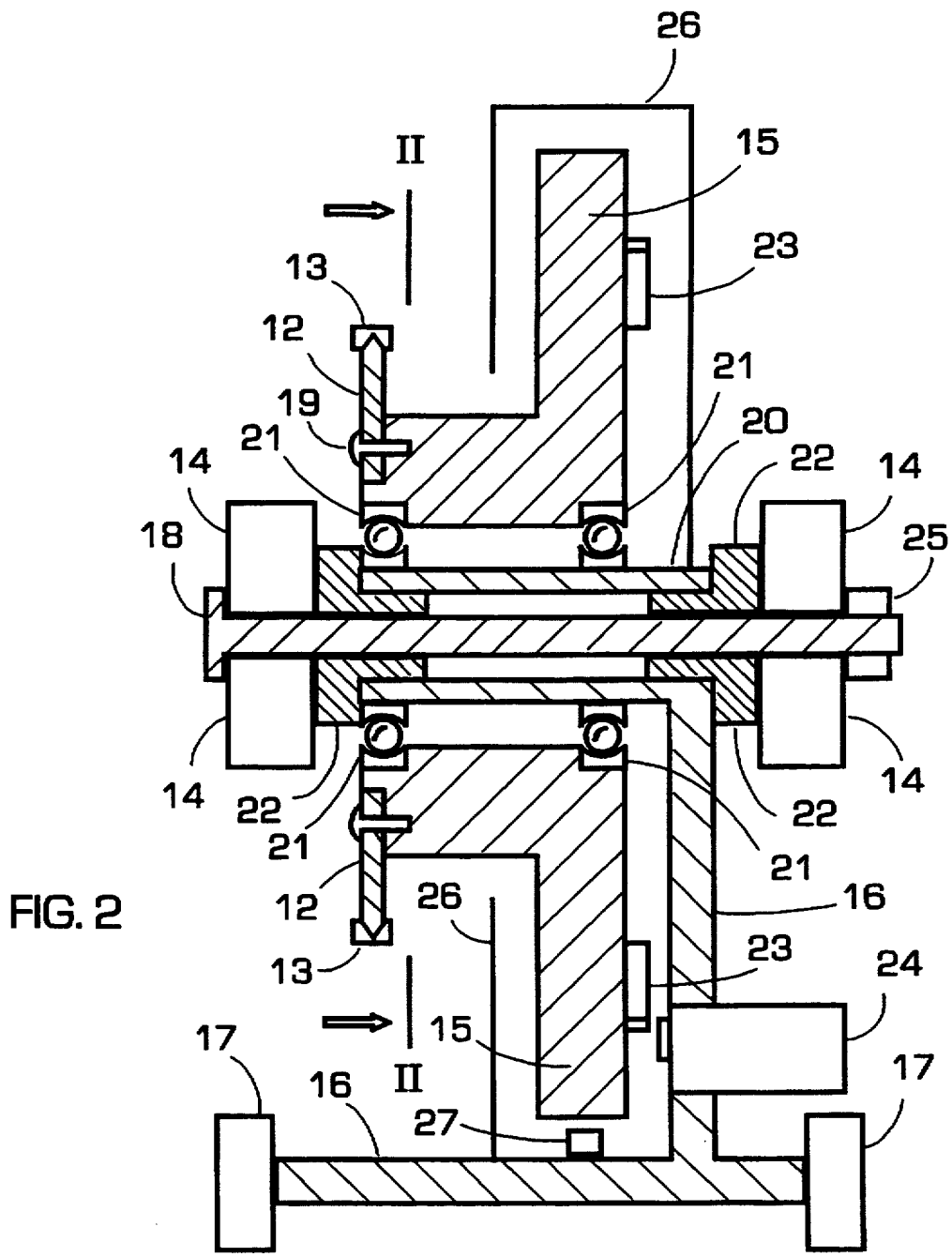
FIG. 2 is a sectional view of FIG. 1 along line I—I.

In FIG. 2, flywheel 15 is supported on axle 18 by eccentric chain adjusting spacers 22, support section 20, and flywheel bearings 21. Drive sprocket 12 is secured to flywheel 15 by bolts 19. Axle 18 is secured by axle nut 25. Electric starter motor 24 acts on starter gear 23 and can be used to start the motorcycle.

Figure 3:
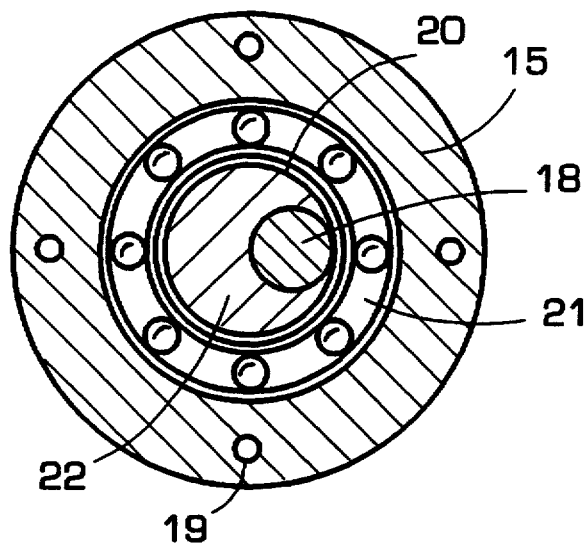
FIG. 3 is a sectional view of FIG. 2 along line II—II.

In FIG. 3, axle 18 is supported by eccentric drive chain adjusting spacer 22 within support section 20 and provides adjustment of the drive chain 13 without disturbing the original chain adjustment settings.

Figure 4:
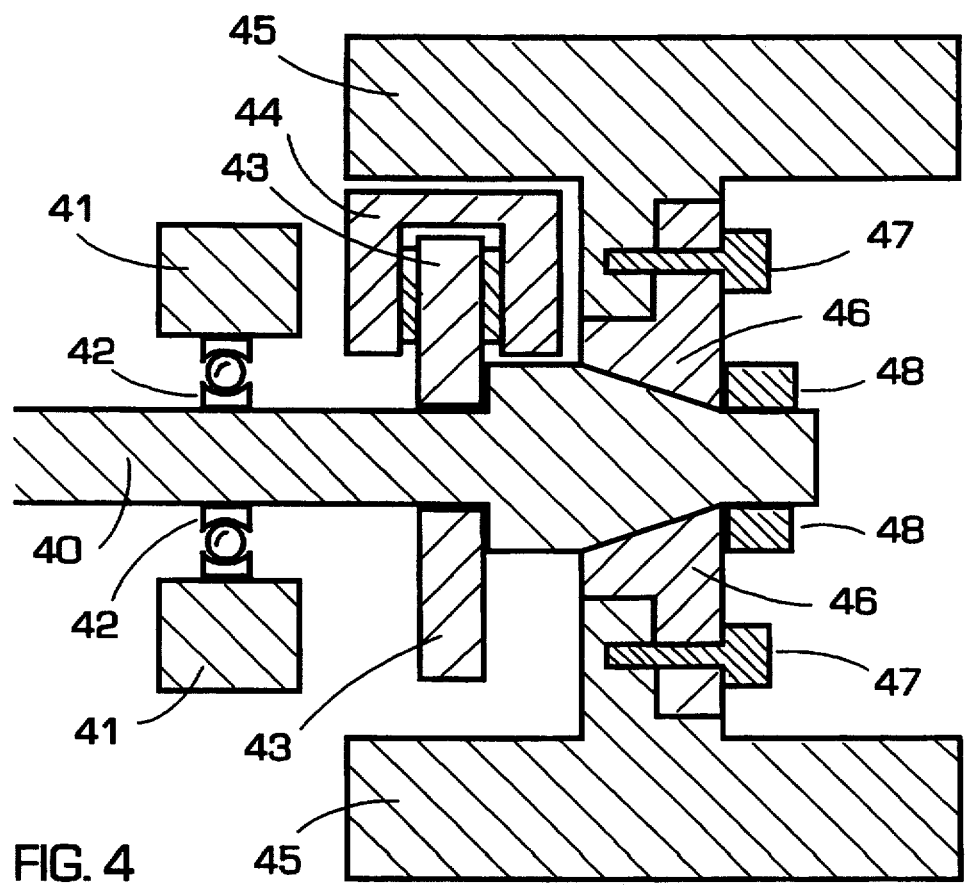
FIG. 4 shows an application of the present invention to a dynamometer for an automotive vehicle using a drive shaft or drive stub-axle.

FIG. 4, illustrates an application of the present invention applied to an automotive vehicle which uses a drive shaft or drive stub-axle such as a motorcycle with a single sided swing arm or motorcar. Drive shaft 40 is supported by support member 41 and bearing 42. Brake disk 43 is attached to drive shaft 40 and has an associated brake caliper 44. Flywheel adapter 46 is attached to flywheel 45 by bolts 47 and is secured on drive shaft 40 by nut 48. The use of a flywheel adapter allows a flywheel to be used with many different mounting types by simply changing the adapter.

VARIATIONS IN FLYWHEEL MOUNTING AND RETAINING METHODS

In the simplest application of the present invention the flywheel uses the same retaining method, and is mounting in substantially the same position, as the driving component which it replaces. In the example of a motorcycle with a chain drive, double sided swing-arm, and a removable axle, the driving wheel of the motorcycle is removed and replaced with a flywheel which is retained using the original axle or a functional replacement. The flywheel is driven by the chain drive of the motorcycle. In the example of a motorcar with a drive shaft and wheel retaining studs, a driving wheel is replaced by a flywheel which is mounted on the wheel studs. In the example of a watercraft, or an aircraft, having a propeller mounted on a propeller shaft the propeller is replaced with a flywheel mounted on the propeller shaft. In the example of a snowmobile the track is replaced by a flywheel.

In any application the flywheel assembly can include a support structure which supports the flywheel until it is mounted on the vehicle for testing, or supports the flywheel during testing, or supports the vehicle during testing, or supports the flywheel and the vehicle during testing.

VARIATIONS IN FLYWHEEL CONSTRUCTION

The flywheel can be constructed in any form which is suitable for replacing a driving component of a vehicle. It can be constructed of any materials which can withstand the environmental and structural requirements of testing. Flywheel materials can include fabricated metal, cast metal, metal and non-metal composites, fiber glass, carbon fiber, and plastics. In any application an inertia flywheel can be constructed of a single member or multiple members. The moment of inertia of a multiple member flywheel can be varied to match a particular application.

VARIATIONS IN DRIVE TRAIN ADJUSTMENT METHODS

When testing a vehicle with an adjustable drive train, for example a motorcycle with a chain or belt drive, it is desirable to make adjustments during testing without disturbing the original adjustment settings. This can be achieved by including drive train adjustment within the inertia flywheel assembly. Various methods can be used including a linear sliding adjuster and an eccentric adjuster as shown in FIG. 3.

VARIATIONS IN DYNAMOMETER SYSTEMS

It is envisaged that many types of dynamometer systems can be use in association with the inertia flywheel assembly of the present invention. These systems can include computer, digital, or analogue components and can include data acquisition and control functions. Vehicle data 31 can include power plant speed, energy usage, frequencies, temperatures, pressures, flow rates, and diagnostics from sources such as power plant management systems, ignition, electrical, fuel, lubrication, coolant, and exhaust, systems. Environment data 32 can include air temperature, barometric pressure, and humidity. The flywheel data 33 can include flywheel speed and acceleration. The vehicle control 34 can include control of power plant speed, fuel, ignition, and electrical systems. In one application example of the present invention a dynamometer computer system monitors a vehicle's engine speed, flywheel speed and environmental inputs. This data together with the moment of inertia of the flywheel is applied to known engineering formula for the calculation of power plant performance including horsepower and torque.

Although the descriptions above contain many specifications and specific modifications, these should not be construed as limiting the scope of the invention but as merely providing examples of some of the presently preferred embodiments of this invention.

Thus the scope of the invention should be determined by the appended claims and their legal equivalents, rather than by the examples given.

I claim:

1. An inertia flywheel assembly of a dynamometer for testing an automotive vehicle comprising:
   an inertia flywheel means;
   a mounting means for said inertia flywheel means which provides for the replacement of a final component of the power transmission of said automotive vehicle with said inertia flywheel means;
   connecting means for said inertia flywheel means so that said inertia flywheel means is connected to and is driven by said power transmission of said automotive vehicle.

2. An inertia flywheel assembly according to claim 1 wherein said automotive vehicle is selected from the group consisting of motorcycles, motorcars, trucks, aircraft, watercraft, karts, self propelled wheeled vehicles, and snow mobiles.

3. An inertia flywheel assembly according to claim 1 wherein said final component of said power transmission is selected from the group consisting of wheels, water propellers, air propellers, and vehicle tracks.

4. An inertia flywheel assembly according to claim 1 further comprising a supporting and transporting means for said flywheel assembly.

5. An inertia flywheel assembly according to claim 1 further comprising a flywheel sensing means.

6. An inertia flywheel assembly of a dynamometer according to claim 1 where said dynamometer is capable of acquiring and performing computations on data from one or more sources relating to said automotive vehicle or said inertia flywheel means or the environment.

7. An inertia flywheel assembly according to claim 1 further comprising a flywheel safety guard means.

8. An inertia flywheel assembly according to claim 1 wherein said mounting means includes a changeable flywheel adapter which provides for said inertia flywheel means to be mounted to various power transmissions.

9. An inertia flywheel assembly of a dynamometer for testing a self propelled wheeled vehicle comprising:
   an inertia flywheel means;
   a mounting means for said inertia flywheel means which provides for the replacement of at least one driving wheel of said wheeled vehicle with said inertia flywheel means so that said inertia flywheel means is mounted on said wheeled vehicle in substantially the same position as was at least one of said driving wheels prior to it being replaced;
   a connecting means for connecting said inertia flywheel means to the power transmission of said wheeled vehicle so that said inertia flywheel means is driven by said power transmission.

10. An inertia flywheel assembly according to claim 9 further comprising a supporting and transporting means for said flywheel assembly.

11. An inertia flywheel assembly according to claim 9 further comprising a starting means for starting the power plant of said wheeled vehicle.

12. An inertia flywheel assembly according to claim 9 further comprising a flywheel sensing means.

13. An inertia flywheel assembly according to claim 9 further comprising a flywheel safety guard means.

14. An inertia flywheel assembly according to claim 9 wherein said mounting means includes a changeable flywheel adapter which provides for said inertia flywheel means to be mounted to various power transmissions.

15. An inertia flywheel assembly of a dynamometer for testing a motorcycle comprising:
  an inertia flywheel means;
  a mounting means for said inertia flywheel means which provides for the replacement of a driving wheel of said motorcycle with said inertia flywheel means so that said inertia flywheel means is mounted on said motorcycle in a similar position to that of said driving wheel prior to it being replaced and so that said inertia flywheel means can be driven by the power transmission of said motorcycle;
  connecting means for connecting said inertia flywheel means to the power transmission of said motorcycle.

16. An inertia flywheel assembly according to claim 15 further comprising a supporting and transporting means for said flywheel assembly.

17. An inertia flywheel assembly according to claim 15 further comprising a starting means for starting the power plant of said motorcycle.

18. An inertia flywheel assembly of a dynamometer according to claim 15 where said dynamometer is capable of acquiring and performing computations on data from one or more sources relating to said motorcycle or said inertia flywheel means or the environment.

19. An inertia flywheel assembly according to claim 15 further comprising a flywheel safety guard means.

20. An inertia flywheel assembly according to claim 15 wherein said mounting means includes a changeable flywheel adapter which provides for said inertia flywheel means to be mounted to various motorcycle transmissions.

* * * * *